(12) United States Patent
Alme et al.

(10) Patent No.: US 8,850,584 B2
(45) Date of Patent: Sep. 30, 2014

(54) SYSTEMS AND METHODS FOR MALWARE DETECTION

(75) Inventors: Christoph Alme, Paderborn (DE);
Micha Pekrul, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 21 days.

(21) Appl. No.: 13/021,585

(22) Filed: Feb. 4, 2011

(65) Prior Publication Data
US 2011/0197281 A1   Aug. 11, 2011

Related U.S. Application Data

(60) Provisional application No. 61/302,414, filed on Feb. 8, 2010.

(51) Int. Cl.
| G08B 23/00 | (2006.01) |
| H04L 29/06 | (2006.01) |
| G06F 21/55 | (2013.01) |
| G06F 21/56 | (2013.01) |

(52) U.S. Cl.
CPC ............ H04L 63/145 (2013.01); G06F 21/552 (2013.01); G06F 21/564 (2013.01)
USPC .............................................. 726/24; 726/22

(58) Field of Classification Search
USPC ..................................... 726/24, 22
See application file for complete search history.

(56) References Cited

U.S. PATENT DOCUMENTS

| 7,290,061 | B2 * | 10/2007 | Lentini et al. ................. 709/246 |
| 7,487,540 | B2 * | 2/2009 | Shipp ............................. 726/22 |
| 8,087,082 | B2 * | 12/2011 | Bloch et al. ..................... 726/22 |
| 8,321,955 | B2 * | 11/2012 | Feng et al. ...................... 726/27 |
| 8,429,545 | B2 * | 4/2013 | Dixon et al. .................. 715/760 |
| 8,474,048 | B2 * | 6/2013 | Masood .......................... 726/24 |
| 8,515,918 | B2 * | 8/2013 | Borders ........................ 707/687 |
| 8,601,256 | B2 * | 12/2013 | Baentsch et al. .............. 713/151 |
| 8,627,479 | B2 * | 1/2014 | Wittenstein et al. ............ 726/25 |
| 2006/0075494 | A1 * | 4/2006 | Bertman et al. ................. 726/22 |
| 2008/0005273 | A1 * | 1/2008 | Agarwalla et al. ............ 709/217 |
| 2009/0158430 | A1 * | 6/2009 | Borders .......................... 726/23 |
| 2009/0328186 | A1 * | 12/2009 | Pollutro et al. ................. 726/13 |
| 2010/0103837 | A1 * | 4/2010 | Jungck et al. ................. 370/252 |
| 2010/0192212 | A1 * | 7/2010 | Raleigh ............................. 726/7 |
| 2010/0332522 | A1 * | 12/2010 | Steidley ........................ 707/769 |
| 2011/0083180 | A1 * | 4/2011 | Mashevsky et al. ............ 726/23 |
| 2011/0167493 | A1 * | 7/2011 | Song et al. ...................... 726/23 |
| 2011/0247073 | A1 * | 10/2011 | Surasathian .................... 726/24 |
| 2011/0302653 | A1 * | 12/2011 | Frantz et al. .................... 726/22 |
| 2012/0066759 | A1 * | 3/2012 | Chen et al. ...................... 726/15 |
| 2012/0110174 | A1 * | 5/2012 | Wootton et al. ............... 709/224 |
| 2012/0173603 | A1 * | 7/2012 | Okamoto ...................... 709/201 |
| 2012/0311706 | A1 * | 12/2012 | Newman ......................... 726/22 |
| 2013/0263247 | A1 * | 10/2013 | Jungck et al. ................... 726/13 |
| 2013/0333037 | A1 * | 12/2013 | Bowen et al. ................... 726/23 |
| 2014/0090059 | A1 * | 3/2014 | Wang et al. ..................... 726/23 |

* cited by examiner

*Primary Examiner* — Kevin Bates
*Assistant Examiner* — Clarence D McCray
(74) *Attorney, Agent, or Firm* — Wong, Cabello, Lutsch, Rutherford & Brucculeri, L.L.P.

(57) ABSTRACT

Various embodiments include a computer system comprising a computer network including at least one client computer, the at least one client computer operable to generate a request, and an anti-malware engine coupled to the computer system and operable to provide anti-malware protection for the computer network, wherein the anti-malware engine is operable to receive the request generated by the at least one client, and to determine if the request is classified as malware by determining whether the request includes one or more valid tags.

26 Claims, 4 Drawing Sheets

SYSTEMS AND METHODS FOR MALWARE DETECTION

CLAIM OF PRIORITY

This application claims the benefit of priority under 35 U.S.C. §119(e) of, U.S. Provisional Patent Application Ser. No. 61/302,414, entitled "SYSTEMS AND METHODS FOR MAL WARE DETECTION," filed on Feb. 8, 2010, the benefit of priority of which is claimed hereby, and which is incorporated by reference herein in its entirety.

BACKGROUND OF THE INVENTION

1. Field of the Invention

The present invention is related to computer network security, and more particularly, to a system and method for detection of and limiting the activity of malicious software programs.

2. Background Information

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware").

Such programs, when installed on the user's computer, can eavesdrop on the user, collect sensitive information and, in some cases, take control of the user's computer. In some cases, these software programs send messages out to other computers or servers, providing a conduit for the transfer of potentially sensitive information.

The ability of such programs to communicate with the outside world via an outbound connection can be limited in some cases. For instance, on some non-Web-typical ports, such communications can be blocked at the transport layer. Other non-Web-typical protocols can be blocked at the application layer. Outbound connections established as cookies in Hypertext Transfer Protocol (HTTP) requests can be blocked by a cookie filter.

But when malicious program code such as Adware or Spyware sends back this data embedded into an HTTP data upload request, e.g. an HTTP POST request or an HTTP GET request with the uploaded data embedded as parameters into the Request URI, this upload is not distinguishable from a regular HTTP data upload request, such as, for example, when using a Search form on a web page.

One approach to preventing the transfer of data embedded into an HTTP data upload request would be to "brute force" block all HTTP POST requests. Such an approach would, by its nature, result in a large number of false-positives. In addition, such an approach would break a number of Web forms, significantly degrading the web browsing experience for users.

As noted above, an HTTP GET request can be used to transfer data embedded as parameters into the Request URI. To block this approach one would have to use a Universal Resource Locator (URL) filter to block HTTP GET requests to suspicious sites. This is, however, a reactive measure. To prevent uploads to newly registered Ad-/Spyware home server domains, a user/customer would have to also deny access to uncategorized web sites, further degrading the user experience.

What is needed is a system and method for limiting the ability of spyware, adware and malware programs to communicate effectively with remote computers or servers.

DETAILED DESCRIPTION OF THE INVENTION

Figure 1:
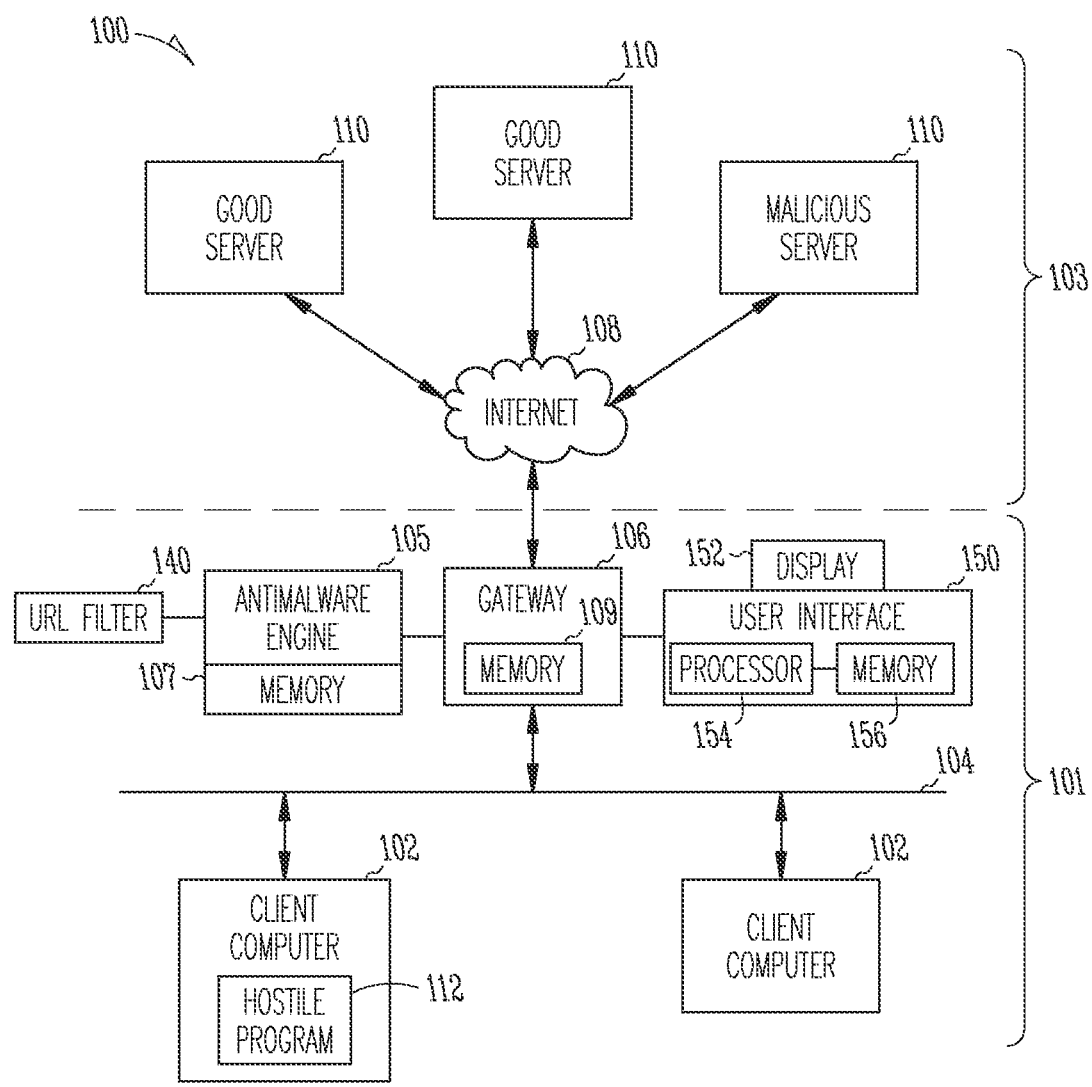
FIG. 1 illustrates a computer network according to various embodiments.

In the following detailed description of the various embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As described above, various terms such as "Malware," "Spyware," and "Adware" are used to classify various types of software or computer code based on, for example, the type or types of activates the software or computer code performs, or is intended to perform. These terms tend to change over time, and new terms are coined as new types of undesirable software and computer code appear. Therefore, in the detailed description of this specification, the term "malware" refers to any and all types of software and computer code that is deemed to be undesirable or unsolicited, or both, from the perspective of the computer or computers, and computer networks, that are intended to be protected by any embodiments and variations of the systems, methods and apparatus described herein.

The majority of contemporary malware uses two or more stages of component downloads to a target computer or computer network. In some instances, this is due to the desire to restrict bandwidth needed for initial malware spreading, and in some instances, due to the professionalization of today's malware development. In various versions of malware, an initial attack on a computer or a computer network involves loading a small program, or a small amount of malicious code, onto the computer or a computer network. Once this is done, the malware then initiates other malicious activities, such as directing the now infected computer or computer network to download additional malware. In various instances, the malware attempts to accomplish this by manipulating the infected computer or computer network in order to issue requests for further downloads of other malware, such as malicious code or malicious programs, or other downloads that are intended to have malicious behaviors with respect to the infected computer or computer network, or other non-infected computers or computer networks.

Illustrative examples of malware include, but certainly are not limited to:

The Conficker worm, which exploits the MS08-067 vulnerability through the SUB protocol first, and upon success, the shellcode then downloads the actual malicious DLL over the HTTP protocol.

The Zbot spyware, which infects a victim computer with a small Trojan (stub) executable first, which then downloads a command-and-control file which instructs the Zbot first-stage Trojan of further download sites and malicious behavior.

Various instances of malware include unsolicited data uploads initiated by malicious software that follow the goal of phoning stolen data, such as user credentials or sensitive documents, home to the malware attackers' servers, that is, to a malicious servers. Various instances of unsolicited downloads of malicious software follow the goal of, for example, downloading a second stage malware component, or downloading a command-and-control file that instructs the malware.

Various embodiments of the anti-malware include one or more systems, one or more apparatus, or one or more methods, or some combination of these, as described herein (hereinafter "anti-malware"), that are operable to detect and to block further attacks of malware. In this description, the term "anti-malware" includes any system, apparatus, or method that incorporates or is operable to perform any combination of the detection, blocking, and testing functions described herein relative to stopping initial or further attaches of malware on a computer or a computer network.

In various embodiments, further attacks include any attempt by a malware that has initially infected a computer or a computer network to manipulate the infected computer or computer network to download additional malware, or to provide instruction to the already downloaded malware. In various embodiments, further attacks include any attempt by a malware that has initially infected a computer or a computer network to manipulate the infected computer or computer network to corrupt or spread the malware to additional portions of the computer or computer system, such as but not limited to another computer or computer network coupled to the infected computer or computer network.

In various embodiments, the anti-malware of the systems, methods, and apparatus described herein is operable to distinguish user-driven downloads, which are desirable or allowable downloads, from unsolicited downloads performed by malicious software (malware). In various embodiments, the anti-malware is operable to distinguish user-driven data uploads from unsolicited uploads, the unsolicited uploads being undesirable, and that are initiated by or because of malicious software.

In various embodiments, the anti-malware is operable to tag one or more links (or in various embodiments, is operable to tag embedded URLs) found in any web content delivered to the computer or computer network for which the anti-malware protection being provided. In various embodiments, any subsequent requests for downloads or uploads originating from the protected computer or computer network are checked for the presence of the valid tag or tags. In various embodiments, only requests that include the valid tag or tags are allowed to be further processed by the system. In various embodiments, further processing includes allowing the request to be forwarded in order to access the information or the data that is being requested as part of the request.

In various embodiments, any response received in reply to a properly tagged request is also tagged at one or more links before the response is allowed to be forwarded on to the protected computer or computer network that generated the request to which the response is in reply to.

In various embodiments, requests that originate from the protected portion of the computer network and that do not include valid tagging at one or more of the links the request are considered suspicious as potentially being malware. In various embodiments, such suspicious requests are blocked. In various embodiments, in addition to being blocked, the suspicious requests are subjected to further processing, including heuristic detection methods, in order to make a further determination as to whether or not the suspicious request is malware, or is generated by malware on the computer or computer network being protected.

In various embodiments, a suspicious request is marked as suspicious, and the request is allowed to be processed to a get a response. Once the response is received and before the response is allowed to be returned to the computer or the computer system being protected, the response is subjected to further anti-malware analysis to determine if the response is malware. In various embodiments, a determination that the response includes malware is useful in that it shows that the request that the response is in reply to is also malware, and thus is useful in locating the computer or other device on a computer system this is infected with malware.

In various embodiments, whitelisting is used to help reduce the number of false positives detected by the anti-malware. In various embodiments, whitelisting includes comparing a suspicious request to a known listing of allowed requests, and if the suspicious request appears on the allowed request whitelist, allowing further processing of the suspicious request. In various embodiment, whitelisting is used to determine a level of anti-malware processing that will be applied to a given suspicious request. For example, certain types of requests can be analyzed less stringently or using less intensive methods of anti-malware if the request is one of the requests, or is a type of request, that is included on a whitelist. Similarly, one or more filters, such as Universal Resource Locator (URL) filters, and source filters, such as content received from a known user, such as a system administration, can be used to reduce false-positives generated by the system.

FIG. 1 illustrates a computer network 100 according to various embodiments. In various embodiments, computer network 100 includes one or more client computers 102 connected on a network 104, and connected through a gateway 106 to one or more servers 110. In various embodiments, the network 104 is a wide-area network (WAN). However, embodiments are not limited to WANs, and other type of networks, including smaller and larger sizes and types of networks, are contemplated by the embodiments described herein.

In various embodiments, computer network 100 includes a protected portion 101. In various embodiments, protected portion 101 includes any combination of computers, computer networks, and other devices such as servers, computer peripherals, such as printers, that are intended to be protected by the anti-malware implemented on or over the protected portion 101. In various embodiments, computer network 100 includes an external portion 103. In various embodiments, external portion 103 includes any computer devices, networks, servers, or other resources that are coupled to the protected portion 101 of computer network 100. In various embodiments, external portion 103 is a source of malware that ends up being loaded onto protected portion 101, or is trying to be loaded onto protected portion 101 of computer system 100.

In various embodiments of computer network 100, one or more of the client computers 102 are connected through the local area network 104 to the gateway 106, and through gateway 106 to Internet 108. Client computers 102 communicate with servers 110 through Internet 108. In various embodiments, anti-malware engine 105 is coupled to gateway 106.

Anti-malware engine 105 is not limited to any particular combination of hardware, firmware, or software, and includes any combination of hardware, firmware, and software implemented to provide the anti-malware protection included in the various embodiments using the systems, apparatus, and methods described herein and contemplated by these systems, apparatus, and methods. In various embodiments, anti-malware engine 105 is incorporated as part of gateway 106. In various embodiments, anti-malware engine 105 is external to gateway 106, and is communicatively coupled to gateway 106.

In the embodiment shown, one or more servers 110 contain malicious program code, such as Adware, Spyware or any other type of malware. A server that contains, or is addressed by, malicious program code will be termed a "malicious" server.

In various embodiments, when a malicious server sends malicious program code such as Adware or Spyware or other forms of malware back to a server embedded into an HTTP data upload request, the upload is not distinguishable from a regular HTTP data upload request, such as, for example, when using a Search form on a web page. This is one way, but not the only way, that malicious program code operates on an infected computer or an infected computer network.

In the embodiment shown in FIG. 1, one of the client computers 102 includes a hostile program 112. A hostile program is not limited to any particular type of program, and in various embodiments, is any program that is malware. In various embodiments, hostile program 112 will generate a request to a malicious server 110, the request an attempt to have malicious server 110 provide additional malware in response to the request. In various embodiments, hostile program 112 generates a request that will attempt to send data back to malicious server 110, wherein the data is not authorized to be released, or is not intended to be released, to the external network 103, or to other portions of the protection portions 101 of computer network 100.

In operation, gateway 106 receives all requests originating from the protected portion 101 of computer network 100. In various embodiments, a request includes an HTTP request. However, embodiments are not limited to HTTP requests, and requests include any type of request generated by one or more devices within the protected network that require a response, data, or both, from any other source, either within the protected portion 101, or located in the external portion 103.

Anti-malware engine 105, operating at gateway 106, receives and processes the request. In various embodiments, the request is an HTTP message. In various embodiments, an HTTP message is an HTTP request. In various embodiments, the HTTP message is an HTTP response. In various embodiments, the gateway 106 includes a handling HTTP proxy to pass the request to the anti-malware engine.

In various embodiments, the received request is analyzed to determine the links present in the request, if any. In various embodiments, links include, but are not necessarily limited to, HTTP links. An illustration of an HTTP link is shown below:

---

<html>
...
<a href=http://example.com/update.exe>Update</a>     (Link 1)
...

---

In this illustration, the link is an executable file extension in the URL of the link. However, links are not limited to any particular type of link. The types of links scanned for are determined by the parameters included in the anti-malware engine 105. In various embodiments, the parameters used to identify links are stored in a memory such as memory 107, or memory 109, and in various embodiments can be amended to change or add to the parameters used to identify links.

In various embodiments, links are scanned for and tagged within the body of an E-mail message, or within an Instant Messaging (IM) message.

In various embodiments, heuristics are used to scan a link and apply tags to only certain links. The use of heuristics can be employed in order to reduce the number of false-positives generated in response to tagging requests. In various embodiments, heuristics are used to apply tags to links, or to one or some combination of links such as:

that are visible or may be visible dynamically at runtime
    User-clickable or other type of user selectable links,
    Links pointing to executables, such as hut not limited to ".exe" file extensions in the URL.

In various embodiments, content received at the gateway 106 and not classified as malware is subsequently tagged at one or more links before being passed on to the protected portion 101. At some later time, when gateway 106 receives a request from protected portion 101, the request is analyzed to determine if the request includes one or more valid tags. Presence of the tags can be used as an indication that the request is a properly generated (non-malware) request from the protected portion 101 of the computer network. Absence of the valid tag or tags in a request received from the protected portion 101 of the computer network can be an indication of malware that is currently infecting the protected portion 101, and attempting some type of malicious activity. This malicious activity can be identified, reported, and the source of the request, and therefore the location and source of the malware, can be determined and isolated, blocked, or otherwise disabled.

In various embodiments, if content, including a request, that is received at the gateway 106 is initially determined to be suspicious as potentially being malware, the suspicious content can be checked against pre-determined criteria or lists, such as but not limited to a whitelist stored in memory 107. In various embodiments, the suspicious content can be checked using a Universal Resource Locator (URL) filter, such as URL filter 140 coupled to the anti-malware engine 105. If the suspicion content is cleared as being listed in the whitelisting, or is cleared by use of the URL fitter, or both, the content, in various embodiments and subject to any other application of anti-malware processing deemed appropriate, is cleared for forwarding to protected portion 101 of computer network 100.

In various embodiments, a user interface 150 is coupled to the gateway 106. User interface 150 is not limited to any particular type of interface, and in various embodiments, includes any of or a combination of a display 152, a processor 154, and a memory 156. In various embodiments, user interface 150 is operable to allow system administrator (not show in FIG. 1) to input, to add to, to delete, or to otherwise amend any of the parameters, criteria, thresholds, and other instructions used in the anti-malware engine as part of the anti-malware protection provided by the anti-malware engine 105. In various embodiments, user interface 150 is operable to allow a system administrator (not shown in FIG. 1) to add, delete, and to modify one or more whitelists or URL filters as descried herein, and as coupled to or available to the anti-malware engine 105.

In various embodiments, the user interface 150 is operable to allow downloading of one or more trusted IP addresses in the network, or one or more trusted accounts to be identified by authentication, from which originating requests should not be subjected to the anti-malware processing provided by the anti-malware engine 105.

In various embodiments, user interface 150 is operable to allow downloading of executables and other types of files to the computer network without having the download flagged as malware. In some embodiments, downloads received at the computer network from user interface 150 are processed and tagged by one or more of the processes included in the anti-malware provided by anti-malware engine 105.

Figure 2:
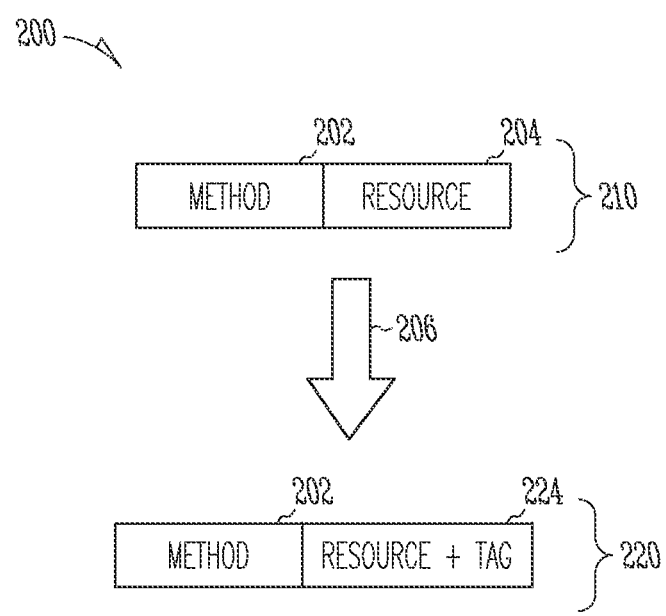
FIG. 2 illustrates a diagram of a request as an untagged link, and then the request as a tagged link, according to various embodiments.

FIG. 2 illustrates a diagram 200 of a request as an untagged link 210, and then the request as a tagged link 220, according to various embodiments. In diagram 200, untagged link 210 includes a method portion 202, and a resource portion 204. In HTTP requests, the request link includes a first portion that defines the Request Method, and a following portion that identifies the resource call by the request. However, in various embodiments, wherein link 210 is not necessarily an HTTP request, method portion 202 can represent any type of header portion for the link 210, and resource portion 204 can represent any type of information in the link 210, including addresses for, or other means, identifying a resource call by the request associated with link 210.

As represented by arrow 206, a tagged link 220 is illustrated having method portion 202, and a resource+tag portion 224. In portion 224, the information in portion 204 has been changed in some manner, including but not limited to having information added to portion 224 as compared to resource portion 204. The changes are not limited to any particular method or technique for modifying the resource portion 204, and include but are not limited to any of the techniques and methods described herein. The changes to portion 224 would be recognized as having at least one valid tag added to link 220.

In various embodiments, link 220 has been tagged in such a manner as to allow the tags to be removed from link 220 in order to again provide a link having the original form of link 210.

Figure 3:
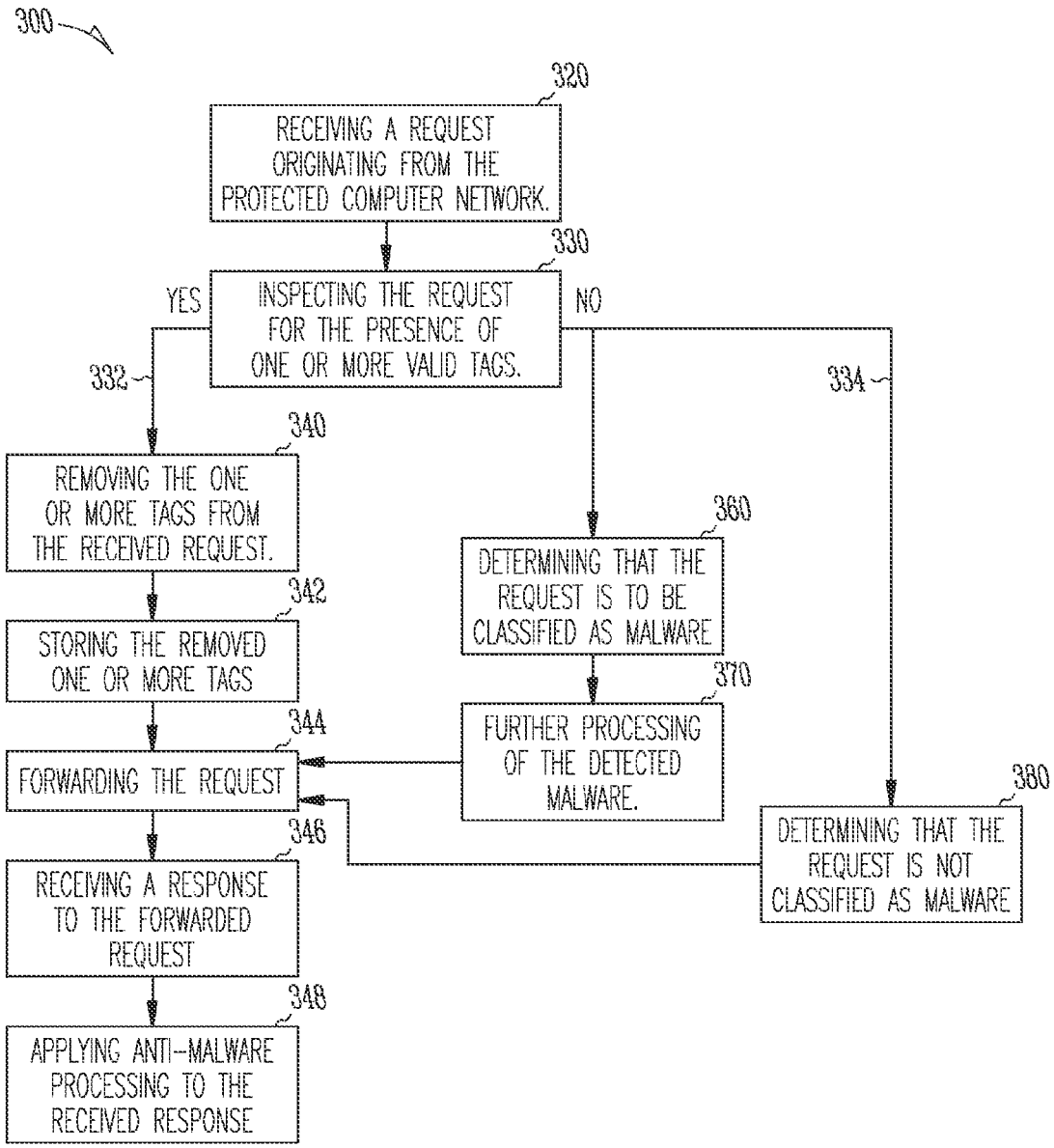
FIG. 3 illustrates various methods of processing one or more requests generated by a protected computer network.

FIG. 3 illustrates various methods 300 of processing one or more requests generated by a protected computer network. In various embodiments, the processing of the requests is performed by an anti-malware engine, such as but not limited to the anti-malware engine 105 as shown in FIG. 1. In various embodiments, the processing of the requests includes processing the requests at a gateway, such as but not limited to gateway 106 as shown in FIG. 1. In various embodiments, the requests are generated by one or more of the devices included in a protected portion, such as but not limited to protected portion 101 of a computer network.

At 320, method 300 includes receiving a request originating from the protected computer network. In various embodiments, the request is directed to one or more resources included within the protected computer network. In various embodiments, the request is directed to one or more resources located externally to the protected computer network, such as external portion 103 as shown in FIG. 1. In various embodiments, receiving the request includes receiving the request at a gateway, such as but not limited to gateway 106 as shown in FIG. 1. In various embodiments, receiving the request includes forwarding the request to an anti-malware engine, such as anti-malware engine 105 as shown in FIG. 1, for further processing. In various embodiments, the received request is passed to the anti-malware engine by an HTTP proxy (not shown in FIG. 1 or FIG. 3). In various embodiments, the received request is passed to the anti-malware engine by an Internet Content Adaptation Protocol (ICAP) server (not shown in FIG. 1 or FIG. 3).

The received request is not limited to any particular format, language, or type of request. In various embodiments, the received request is a HTTP message including an HTTP request. In various embodiments, the HTTP message is encapsulated. In various embodiments, the received request includes an e-mail message. In various embodiments, the received request includes an Instant Messaging (IM) message.

At 330, method 300 includes inspecting the request for the presence of one or more valid tags. Valid tags are any forms of information added to any content received at or generated by the protected portion of a computer network, the information added being then used for any anti-malware detection and prevention operations. Valid tags include, but are not limited to, the tags as shown and described herein relative to FIG. 2.

In various embodiments, if one or more valid tags are found in the request, method 330 proceeds to path 332 represented by the "YES" arrow, and to 340. In various embodiments, if no valid tags are found in the request, or if tags that are determined to be invalid are found in the request, method 330 proceeds to path 334 represented by the "NO" arrow.

At 340, method 300 includes removing the one or more tags from the received request. In various embodiments, after removing the one or more tags, the method proceeds to 342.

At 342, method 300 includes storing the removed one or more tags in data field(s) associating the request with a particular transaction. In various embodiments, the removed one or more tags are stored in an internal (meta) header, or in a status field, that corresponds to the particular transaction associated with the request. In various embodiments, the transaction is stored in a memory, such as memory 109, or memory 107, included in a gateway or in an anti-malware engine, as shown in FIG. 1. In various embodiments, the particular transaction is stored so that the request can be associated with a response that is received as a reply to the request.

At 344, method 300 includes forwarding the request. In various embodiments, forwarding the request includes forwarding the request to a resource that is located externally to the protected computer network. In various embodiments, forwarding the request includes forwarding the request to a resource that is located within the protected computer network.

At 346, method 300 includes receiving a response to the forwarded request. In various embodiments, receiving the response includes associating the response with the request that the response belongs to, that is, the request to which the response was generated in reply to.

At 348, method 300 includes applying anti-malware processing to the received response. Applying anti-malware processing includes any combination of anti-malware detection and prevention, including the anti-malware processing described relative to method 400 and FIG. 4 herein. In various embodiments, applying anti-malware processing includes determining that the response is not to be classified as malware, and then adding one or more valid tags to the response, followed by forwarding the response including the one or more valid tags, on to the protected computer network.

At 360, method 300 includes determining that the request it to be classified as malware. In various embodiments, classifying a request as malware includes determining that a request has no valid tags. In various embodiments, classifying a request as malware includes determining that the request has no valid tags, and also meets one or more other specific criteria. In various embodiments, classifying a request as malware includes determining that a request has one or more tags that are not valid tags.

In some embodiments, if no tags are present in the request and the request is a HTTP POST request, the request is classified a malware. In various instances, such a request is a malicious phone-home activity.

For example, malware may send an HTTP request to its home servers that looks like this:

```
POST /emachine.asp HTTP/1.1
Accept: */*
Content-Type: application/x-www-form-urlencoded
X-UA: WinInet 6.0.2800.1106, 1.1, 1.0
User-Agent: Gator/7.0 RequestMachineInt
Host: gi.gator.com
Content-Length: 92
Connection: Keep-Alive
Cache-Control: no-cache
Field1=Q0QDJIKsJAAAAFgY%2b4Vmzen [...]
a%2fzZkvPxp7dhfnS9MIXRE%3d%3d%3d&
```

The intent of the base64-encoded data in the Field1 parameter is unknown. It may be "only" a request to download more software components, or it may as well be the uploading of just collected, potentially sensitive user-information—that is—it would be considered malware.

In some embodiments, if no tags are present in a request, and the request is an HTTP GET request, the request is analyzed further for more specific criteria. By way of illustration, the HTTP GET request in some embodiments is classified as malware if no valid tags are present and the request URL contains an overly long parameter, and based on data anomaly heuristics such as, but not limited to, high information entropy, the parameter value appears anomalous. In another illustration, the HTTP GET request is classified as malware if no valid tags are present and the request URL contains an anomalous high amount of small parameters. In various embodiments, the determination of criteria such as but not limited to high information entropy and a high amount of small parameters is made on the basis of exceeding or not exceeding one or more pre-determined thresholds for these parameters.

In various embodiments, if no tags are present in a request, a URL filter component can be utilized to determine if the request should be classified as malware. The URL filter is used to determine that the request URL is categorized in a category not expected in the content of the request, and therefore should be classified as malware. An illustration is a request URL for "Online Banking Sites" that would be categorized by the URL filter as unexpected.

In some embodiments, if no tags are present in the request, and the request contains unusual header fields, such as known bad User-Agents, or contains malformed header values, the request is classified as malware.

In various embodiments, if the request was found to be tagged, but one or more of the tags is not valid, the request is classified as malware.

In various embodiments, requests that have been classified as malware are further processed, as described in method 300 at 370. In various embodiments, requests that have been classified as malware are checked against a whitelist, as described in method 300 at 380.

At 370, method 300 includes further processing of the detected malware. Further processing can include any type of anti-malware processing. In various embodiments, the further processing is performed in order to determine what devices, or which portion of a computer network the request that is now classified as malware originated from. The further processing in some embodiments includes taking steps to block the request from being further processed, and to prevent the request from infecting other computers or portions of a protected computer network. In various embodiments, further processing includes taking steps to isolate, disconnect or to otherwise disable the device or portion of the computer network believed to have generated the request that is now classified as malware.

In various embodiments, further processing includes reporting the classification of the request as malware, for example, to a logging function, or to a system administrator, or both. In various embodiments, such reporting includes sending an alert message to a user interface that, (such as but not limited to the user interface 150 as shown in FIG. 1.) that a request now classified as malware has been detected.

In various embodiments, even after classifying a request as malware, the further processing of the request applied to the request can be used to determine that the request in fact is not malware, and the request is then allowed to be forwarded as described at 344 of method 300.

Referring again to FIG. 3, at 380, method 300 includes determining that the request is not classified as malware. In various embodiments, this determination can be made by applying further processing of the request, as described at 370 of method 300. In various embodiments, whitelisting can be employed to determine that a request that has no valid tags, or that has one or more invalid tags, is not necessarily malware based on the whitelisting.

In various embodiments, whitelisting is a stored set of rules, lists, or both, that are applied to requests that are suspected to be malware but that are pre-determined to be acceptable and forwardable requests, that is, requests that are to not to be classified as malware by the anti-malware engine. In various embodiments, whitelisting includes a listing of specific requests, such as in a data table, that are pre-registered and that are not to be classified as malware.

In various embodiments, whitelisting includes both rule based and pre-registered table based methods, or some combination thereof, for determining that a suspicious request is not malware. By way of illustration, a suspicious request can first be checked against the pre-registered list to determine if it is not to be classified as malware, and if is appears on the list, the request is allowed to be forwarded. If the request is not found on the whitelist, the rule based whitelisting can then be applies. In various embodiments, the rule based whitelisting is applied first, and if the request is still considered malware, the request can then be checked against the pre-registered table of requests.

In various embodiments, one or any combination of criteria can be used as a part of the whitelisting method. These various criteria include, but are not necessarily limited to the following:

The presence and successful verification of a digital signature (Autenticode);

A URL filter component classifying the request URL in a trustworthy category, (an example of a trustworthy category could be "Software Vendors");

A list of known, trustworthy download URLs, known trustworthy (web statistics) upload URLs or both, which are available be to be used for whitelisting, and the request;

A combination of destination URL and User-Agent could be used as a stricter characteristic to ensure that a request is performed by a legitimate (not malware) application, or is legitimate "in context." By way of illustration, an application with a User Agent of "Adobe Update Manager" should only be seen accessing "adobe.com," Other accesses outside of the legitimate context may not be whitelisted, or in various embodiments, be classified a malware.

In various embodiments, whitelisting includes a human-readable challenge-response test. In various embodiments, client devices on the protected network include a graphical web browser interface where one or more error messages generated by the anti-malware engine providing anti-malware protection for the client device can be displayed at the client device. These error messages in some instances are initiated when a particular upload or down is initially being blocked by the anti-mal ware engine. In such instances, the user at the client device is presented the error message and a human-readable challenge-response test, such as a graphical CAPTCHA. When input is received at the client device that properly responds to the test, the blocked upload or download is forwarded to the client device. This type of dynamic, user driven white listing could be employed to prevent false-positives within the web browser content.

In various embodiments, if a request that is initially classified as malware is subsequently cleared as not being malware in either 370 or 380 of method 300, the request is forwarded as shown in 344 of method 300.

Figure 4:
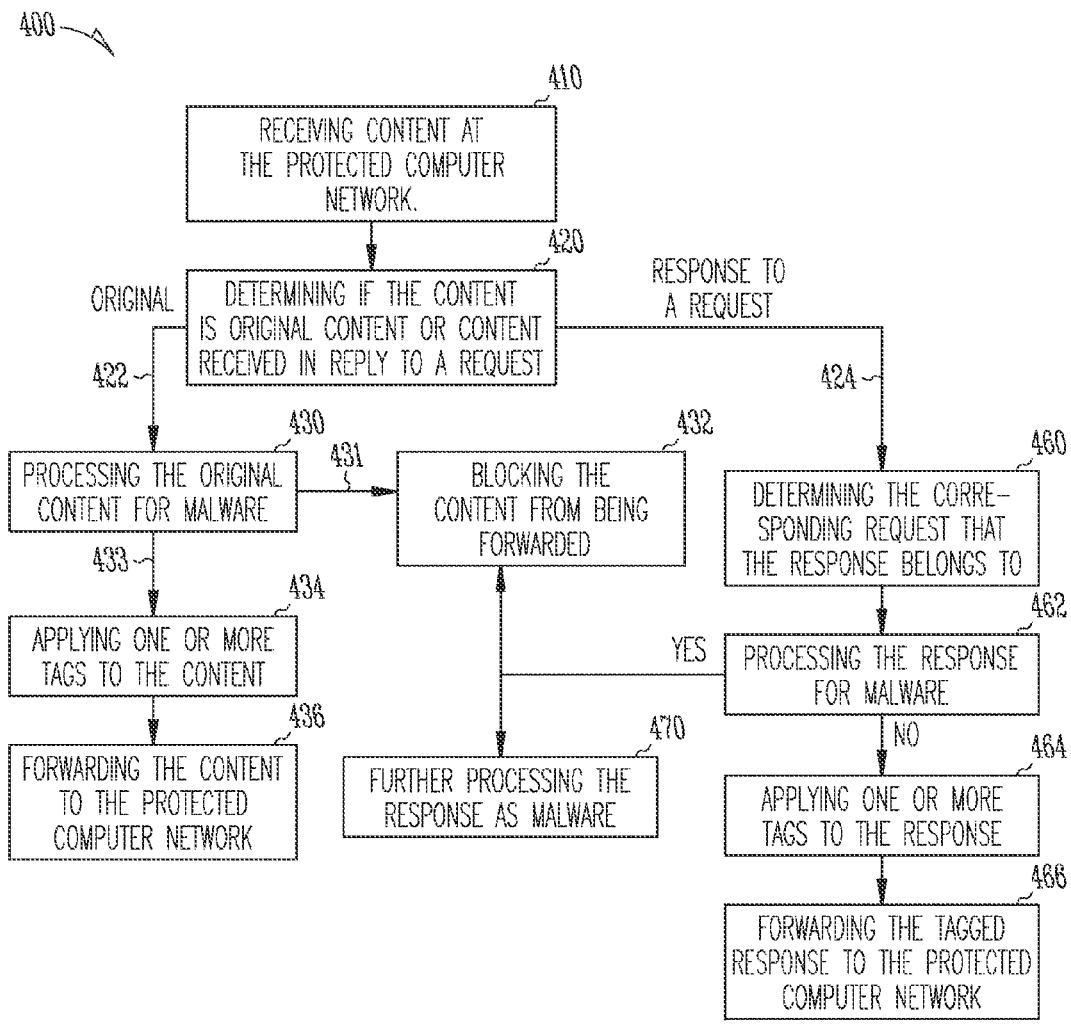
FIG. 4 illustrates various methods of processing content received at a protected computer network.

FIG. 4 illustrates various methods 400 of processing content received at a protected computer network.

At 410, method 400 includes receiving content at the protected computer network. Content can be any data, including applications and web content, including web forms. In various embodiments, the content is received from a source that is external to the protected computer network. In various embodiments, the content is received from a source that is part of the protected computer network.

At 420, method 400 includes determining if the content is original content or content received in reply to a request forwarded from the protected computer network. In various emblements, original content refers to content that is received but that is not associated with a request that is known to have been generated from a source within the protected computer network. An illustration of original content would be an e-mail that is received at the protected computer network and that arrives without any associated request having been issued.

Content received in reply to a request is, generally, a reply that was expected, and that was solicited in reply to the request, the request being one that was known about by and most often issued from the protected computer system.

If the received content is determined to be original content, in various embodiments, method 400 proceeds to 430, as indicated by arrow 422.

At 430, method 400 includes processing the original content for malware. Processing the content for malware is not limited to any particular type of processing, and includes any processing that is applied to the content to determine if the content is to be classified as malware. In various embodiments, further processing including any combination of the further processing described for 360, 370, and 380 of method 300. In various embodiments, further processing includes any of the processes described subsequently for 462 of method 400.

Referring again to FIG. 4, if processing of the content at 430 leads to a determination that the content is to be classified as malware, method 400 proceeds to 432, as represented by arrow 431. At 432, method 400 includes blocking the original content from being forwarded to the protected computer network. Blocking the original content also includes any of the logging, reporting, and error generation functions described herein.

If processing the content at 430 leads to a determination that the content is not to be classified as malware, method 400 proceeds to 434, as indicated by arrow 433.

At 434, method 400 includes applying one or more tags to the content received at the protected computer network. In various embodiments, the received content is scanned for the type of data or format of the content to determine if links exist in the content. By way of illustration, HTML or other browser-rendered content, such as JavaScript, XHTML, XML, email messages or Instant Mail (IM) messages are scanned for links.

Where the content includes links, one or more tags are inserted into the content as valid tags. In various embodiments, heuristics are used to reduce the total number of links in the content that are actually tagged. In various embodiments, tagging of links is limited to links that are visible, or may be made visible dynamically at runtime. In various embodiments, tagging of links is limited to links that are user-clickable, such as but not limited to the selectable portions of a web form, such as a radio button or a selection button. In various embodiments, tagging of links is limited to links pointing to executables, for example, as an ".exe" file extension in the URL.

It would be understood that any combination of these heuristics, in conjunction with other parameters such as a number of links, download bandwidth, and processing time, could be used in any combination to determine which links, and how many of the links in the content, are to be tagged.

In various embodiments, a tagged link is re-written to add a unique tag to the link, the unique tag constructed to be later recognized as a valid tag. In various embodiments, the tag is added in the form of a uniquely named URL parameter. In various embodiments, the tag value of the tag consists of the original URL, or its hash, or the hash of part of the original URL, plus a nonce generated by the anti-malware. In various embodiments, the nonce has a limited lifespan. In various embodiments, the nonce contains installation specific information.

In various embodiments, the tag value contains context information, such as but not limited to information related to which protocol or in which environment the link was found. In various embodiments, the tag value includes information related to which content or code language the link was found. In various embodiments including HTML content, the information includes the HTML element name.

In various embodiments, the tag values are encrypted, or are encoded, or both encrypted and encoded. In various embodiments, the tag value is encoded via base 64 encoding.

In various embodiments, as an alternative to re-writing links in HTTP responses or in other content, the anti-malware engine includes a volatile table in a memory or some other device coupled to the anti-malware engine. In various embodiments, the volatile table maps previously seen links, or a hash value of previously seen links, to their respective tag values. In various embodiments, the volatile table entries are made dependent on a user name, a client IP, or any other means of deterring a user's identity.

In various embodiments, in combination with a Web Cache operating at a network gateway, the content to which any of the links in a request generated by the protected portion of a computer or computer network are pre-fetched, and stored in memory, such as but not limited to the memory 107 in FIG. 1. After pre-fetching the content, the media type of the content is determined and used as another input to the heuristics used to reduce the links tagged in the request related to the pre-fetched content.

In various embodiments, for special cases of "application/executable" content, the pre-fetch operation may be repeated once and the resulting content and media type determined by comparing to the first retrieval. Any difference can be used as an additional indicator, as the original web server may, for example, be delivering new variants of an executable in every request, or can be storing the client IP and sending an executable to the client only once, and delivering empty or other content upon subsequent requests.

At 436, method 400 includes forwarding the content to the protected computer network. In various embodiments, the content includes one or more links that have been tagged with valid tags.

At some later time, this content can be provided, in full, or as part of, a request that is generated from a source on the protected computer network. In various embodiments, the request is processed by the anti-malware engine in the protected portion of the computer network. In various embodiments, the request is a request received as shown at 320 in FIG. 3, and processed by one or more processes associated with method 300.

Referring again to FIG. 4, if it is determined at 420 that the content is a response associated with a request forwarded from the protected computer system, method 400 proceeds to 460, as indicated by arrow 424.

At 460, method 400 includes determining the corresponding request that the response belongs to. In various embodiments, this is accomplished by associating the transition information associated with the response to the transaction information previously stored for the associated request to which the response is in reply to.

At 462, method 400 includes processing the response for malware. Processing of the response for malware is not limited to any particular processing, and can include, but is not limited to, any of the anti-malware processing described herein that would be applicable to responses. In various embodiments, if the request associated with a received response was properly tagged, the response itself is further processed to determine if response still needs to be classified as malware. In various embodiments, the response is compared to the information stored in the tag value of the associated request for the response. In various embodiments, the response is compared to see if the media type of the response is the expected media type based on the associated tag value. In various embodiments, an entropy of the response is calculated or otherwise determined, the entropy of the response evaluated to see if it is an appropriate entropy expected for a proper and non-malicious response to the associated request. Any other characteristic of the response can be used to determine if the response has any abnormality based on the request and the tag value of the request that is associated with the response.

If any abnormalities are detected, the response is classified as malware. Abnormality in the response can include, but are not limited to, detection of a packer or an obfuscation tool in the response. In various embodiments, if the response is classified as malware, it can be subjected to further anti-malware processing. Such further anti-malware processing includes, but is not limited to, in-depth content inspection heuristic, such as using an X-ray to San for hidden URLs, or other embedded file signatures within the content.

Responses that include a media type "application/executable" in the content can be considered suspicious, and can be classified as malware, as this can be an indication of a second stage malicious software component download.

In various embodiments, a determination that the response includes hidden payload embedded inside the content is a basis for classifying the response as malware.

In various embodiments, if no media type can be determined for a response, and the content has a high information entropy, wherein high can be determined to be over a pre-determined threshold value for information entropy, the content can be assumed to be compressed and encrypted, and thus can be classified as malware. In various embodiments, this type of response is a response including the use of Huffman coding. In various embodiments, this type of response could be used to instruct a first stage malware already present on the protected portion of a computer network as to how the first stage should operate in a malicious manner.

In various embodiments, if the processing at 462 results in a determination at the response is to be classified as malware, method 400 proceeds to 432, including blocking the content from being forwarded to the protected computer system, and any reporting, alerting, and logging functions that are deemed application to the detection of the malware.

In various embodiments, if the processing results in a determination that the response is not to be classified as malware, method 400 proceeds to 464.

At 464, method 400 includes applying one or more tags to the response. Adding tags to the response can include any combination of the tagging methods and procedures descried herein, and any methods and procedures contemplated by the application to tagging requests.

At 466, method 400 includes forwarding the tagged response to the protected computer network. As would be understood, all or part of the forwarded response can again be incorporated as part of one or more requests subsequently generated by, or originating from, the protected computer network.

Various embodiments of systems, apparatus, and methods for malware detection have been described herein, and various combinations of these embodiments, are specifically discussed, and are further contemplated by, the present specification.

Embodiment 1 includes a computer system comprising a computer network including at least one client computer, the at least one client computer operable to generate a request, and an anti-malware engine coupled to the computer system and operable to provide anti-malware protection for the computer network, wherein the anti-malware engine is operable to receive the request generated by the at least one client computer, and to determine if the request is classified as malware by determining whether the request includes one or more valid tags.

Embodiment 2 includes the computer system of embodiment 1, wherein the anti-malware engine is operable to determine that a request does not include the one or more valid tags, and to classify the request as malware if the request is an HTTP POST request.

Embodiment 3 includes the computer system of embodiment 1, wherein the anti-malware engine is operable to determine that a request does not include the one or more valid tags, and to class, the request as malware if the request is an HTTP GET request that meets one or more pre-determined criteria.

Embodiment 4 includes the computer system of any of embodiments 1, 2, or 3 further comprising a database including a whitelist coupled to the anti-malware engine, the anti-malware engine operable to determine if a suspicious request is included in the whitelist, and if the suspicious request is included in the whitelist, to allow further processing of the suspicious request.

Embodiment 5 includes the computer system of embodiment 1, wherein the whitelist includes a list of known and trustworthy download Universal Resource Locators.

Embodiment 6 includes the computer system of embodiment 1, wherein the anti-malware engine is operable to determine that at least one or more valid tags are included in the request, to removed the at least one or more tags from the given request, to store the at least one or more valid tags, and to forward the request having had the at least one or more valid tags removed in order to retrieve a response to the request.

Embodiment 7 includes the computer system of embodiment 1, wherein the anti-malware engine is operable to receive a response directed to a protected portion of the computer system, to scan the response for links, and if links are found in the response, to add one or more valid tags to the response before forwarding the response to the protected portion of the computer network.

Embodiment 8 includes the computer system of embodiment 1, wherein the at least one of the one or more valid tags includes a hash value of an original Universal Resource Locator included in a link included in the response, plus a flounce generated by the anti-malware engine.

Embodiment 9 includes the computer system comprising a computer network including at least one client computer, the at least one client computer operable to generate a request, an anti-malware engine coupled to the computer system and operable to provide anti-malware protection for the computer network, wherein the anti-malware engine is operable to receive content at the anti-malware engine that is directed to the computer network, to determine if the content is to be classified as malware, and if the content is not determined to be classified as malware, to scan the content for one or more links, and if the one or more links are found, to add at least one valid tag to at least one of the one or more links before forwarding the content on to the computer system.

Embodiment 10 includes the computer system of embodiment 9, wherein the one or more links found in the content includes a plurality of links, and wherein the anti-malware engine is operable to apply heuristics to a reduced a number of links to which valid tags are to be applied to be some number less than the plurality of links included in the content.

Embodiment 11 includes the computer system of embodiment 9, wherein the reduced number of links includes links that are visible or that are made visible dynamically at runtime.

Embodiment 12 includes the computer system of embodiment 9, wherein the reduced number of links includes links that are user clickable.

Embodiment 13 includes the computer system of embodiment 9, wherein the reduced number of links includes links that include an .exe file extension.

Embodiment 14 includes the computer system of embodiment 9, wherein the anti-malware engine includes a cache memory, the anti-malware engine operable to pre-fetch and store in the cache memory a content pointed to by one or more links included in the content received at the computer network.

Embodiment 15 includes the computer system of embodiment 9, wherein the anti-malware engine is operable to determine a media type for the content, and to use the media type as a heuristic to reduce a total number of links of the one or more links included in the content to which a valid tag will be added to.

Embodiment 16 includes a method comprising receiving at an anti-malware engine a request from a protected commuter network, inspecting the received request for the presence of one or more valid tags, and classifying the request as malware if at least one valid tag is not found included in the request.

Embodiment 17 includes the method of embodiment 16, further comprising determining that the request includes at least one of the one or more valid tags, removing the one or more valid tags from the request, storing the one or more valid tags in data fields associated with a transaction associated with the request, and forwarding the request.

Embodiment 18 includes the method of embodiment 17, including receiving a response to the request, applying anti-malware detection processing to the response to determine if the response is to be classified as malware, if the response is not to be classified as malware, scanning the response for links, and if one or more links are found in the response, adding at least one valid tag to at least one of the one or more links in the response before forwarding the response to the protected network.

Embodiment 19 includes the method of embodiment 18, wherein the one or more links in the response includes a plurality of links, and
wherein adding the at least one valid tag to at least one of the one or more links found in the response includes applying heuristics to reduce a total number of links of the plurality links found in the response to which a valid tag is added.

Embodiment 20 includes the method of embodiment 16, wherein classifying the request as malware further includes processing the request to determine a source of the request within the protected computer network.

Embodiment 21 includes the method of embodiment 17, further including determining that the request does not include at least one valid tag, comparing the request to a whitelist, and forwarding the request if the request is included in a listing included in the whitelist.

Embodiment 22 includes a non-transitory computer memory storing instructions that can be executed by a processor, and that that when executed by the processor, perform a method comprising receiving content at a protected computer network, determining if the content is original content, or if the content is a response to a request previously forwarded by the protected computer network, and if the content is original content, processing the content to determine if the content is to be classified as malware, and if the content is not to be classified as malware, scanning the content for links, and if at east one link is found, applying a valid tag to the at least one link found in the content before forwarding the content to the protected computer network.

Embodiment 23 includes the method of embodiment 22, wherein applying a valid tag to at least one link in the content includes determining that the content includes a plurality of links, and using heuristics to determine a reduced number of links of the plurality of links to which the valid tag is to be applied.

Embodiment 24 includes the method of embodiment 22, further including determining that the content is to be classified as malware, and blocking the content from being forwarded to the protected computer network.

Embodiment 25 includes the method of embodiment 24, further including reporting the classification of the content as malware to a user interface.

Embodiment 26 includes the method of embodiment 26, further including determining that the content that is to be classified malware is a reply to a particular request originating from the protected computer network, identifying a source of the request located within the protected computer network, and isolating the source of the request from the protected computer network.

In the above discussion, the term "computer" is defined to include any digital or analog data processing unit. Examples include any personal computer, workstation, set top box, mainframe, server, supercomputer, laptop or personal digital assistant capable of embodying the inventions described herein. A computer system as described herein can include a single computer, a single computer coupled to one or more other resources, such as but not limited, to one or more computer networks. A computer system as described includes, in various embodiments a computer network coupling a plurality of computers or one or more computers coupled to one or more other resources.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A computer system comprising:
    a processor configured to execute an anti-malware engine, the anti-malware engine operable to receive an outbound request from at least one client computer, the at least one client computer communicatively coupled to the anti-malware engine via a first computer network, the outbound request comprising a transmission of an outbound data message from the first computer network and directed toward a second computer network, the transmission occurring after a received inbound data message addressed to the at least one client computer has been processed by the anti-malware engine, the anti-malware engine further operable to provide anti-malware protection for the at least one client computer,
    wherein the anti-malware engine is further operable to determine if the outbound request is classified as malware by determining whether the outbound request includes one or more valid tags embedded within links inside the outbound data message associated with the outbound request, the one or more valid tags previously embedded within each of one or more links by the anti-malware engine via processing and modifying the received inbound message addressed to the at least one client computer on the first computer network, the processing and modifying performed prior to the inbound message reaching the at least one client computer, each of the one or more links comprising a uniform resource identifier.

2. The computer system of claim 1, wherein the anti-malware engine is further operable to determine that the outbound request does not include the one or more valid tags, and to classify the request as malware if the request comprises an HTTP POST request.

3. The computer system of claim 1, wherein the anti-malware engine is further operable to determine that the outbound request does not include the one or more valid tags, and to classify the request as malware if the request comprises an HTTP GET request that meets one or more predetermined criteria.

4. The computer system of claim 1, further including:
    a database including a whitelist coupled to the anti-malware engine, the anti-malware engine further operable to determine if a suspicious request is included in the whitelist, and if the suspicious request is included in the whitelist, to allow further processing of the suspicious request, wherein the outbound request is considered suspicious when the outbound request has not been determined to include one or more valid tags.

5. The computer system of claim 4, wherein the whitelist includes a list of known and trustworthy download Universal Resource Locators.

6. The computer system of claim 1, wherein the anti-malware engine, upon determination that the outbound request includes one or more valid tags, is further operable to:
    remove the at least one or more tags from the links inside the outbound data message associated with the outbound request; and
    forward the outbound request having had the at least one or more valid tags removed, the forwarding to solicit a response to the outbound request.

7. The computer system of claim 1, wherein the anti-malware engine is further operable to receive the inbound message directed to the first computer network, to scan the received inbound message for links, and if links are found in the received inbound message, to add one or more valid tags to the message before forwarding the received inbound message to the first computer network.

8. The computer system of claim 1, wherein at least one of the one or more valid tags includes a hash value of an original Universal Resource Locator included in at least one of the one or more links, plus a nonce generated by the anti-malware engine.

9. A computer system comprising:
    a processor configured to execute an anti-malware engine, the anti-malware engine configured to provide anti-malware protection for at least one client computer and operable to:
        receive a request from at least one client computer communicatively coupled to the anti-malware engine via a first computer network;
        forward the request from the at least on client computer to a second computer on a second computer network;
        receive, in response to the forwarded request, received content at the anti-malware engine from the second computer network that is directed to the at least one client computer; and
        determine if the received content is to be classified as malware, and if the received content is not determined to be classified as malware, to scan the received content for one or more links, and if the one or more links are found, to add at least one valid tag to at least one of the one or more links by altering the at least one link inside the received content before forwarding the received content on to the at least one client computer, each of the one or more links comprising a uniform resource identifier.

10. The computer system of claim 9, wherein the one or more links found in the received content includes a plurality of links, and wherein the anti-malware engine is operable to apply heuristics to determine a reduced number of links to which valid tags are to be added, the reduced number less than a total number of the plurality of links included in the received content.

11. The computer system of claim 10, wherein the reduced number of links includes links that are visible or that are made visible dynamically at runtime.

12. The computer system of claim 10, wherein the reduced number of links includes links that are user clickable.

13. The computer system of claim 10, wherein the reduced number of links includes links that include an .exe file extension.

14. The computer system of claim 9, wherein the anti-malware engine is coupled to a cache memory, the anti-malware engine operable to pre-fetch and store in the cache memory a linked content, the linked content comprising content pointed to by one or more links included in the received content.

15. The computer system of claim 9, wherein the anti-malware engine is operable to determine a media type for the received content, and to use the media type as a heuristic to reduce a total number of links of the one or more links included in the received content to which valid tags will be added.

16. A method comprising:
  receiving at an anti-malware engine an outbound request for outbound transmission of data from a protected computer network to a second computer network, the anti-malware engine executing on a processor communicatively coupled to the protected computer network and the second computer network, the request originating from a device connected to the anti-malware engine via the protected computer network;
  inspecting the received outbound request for the presence of one or more valid tags, the one or more valid tags comprising tags previously added to one or more links contained inside a prior inbound message addressed to a receiving computer on the protected computer network, the adding occurring prior to receipt of the inbound message at the receiving computer, the one or more links comprising a uniform resource identifier;
  classifying the received outbound request as malware or not malware based upon at least one valid tag being found in the received outbound request;
  removing the at least one valid tag from the outbound request classified as not malware; and
  forwarding the received outbound request, after removal of the at least one valid tag, toward the second computer network.

17. The method of claim 16, further comprising:
  determining that the received outbound request includes at least one of the one or more valid tags; and
  storing the removed at least one of the one or more valid tags in data fields associated with a transaction associated with the received outbound request.

18. The method of claim 17, further including:
  receiving an inbound response to the forwarded received outbound request;
  applying anti-malware detection processing to the inbound response to determine if the inbound response is to be classified as malware; and
  if the inbound response is not to be classified as malware, scanning the inbound response for links, and if one or more links are found in the inbound response, adding at least one valid tag to at least one of the one or more links in the inbound response before forwarding the inbound response to the protected computer network.

19. The method of claim 18, wherein the one or more links in the inbound response includes a plurality of links, and wherein adding the at least one valid tag to at least one of the one or more links found in the inbound response includes applying heuristics to reduce a total number of links of the plurality links found in the inbound response to which valid tags will be added.

20. The method of claim 16, wherein classifying the received outbound request as malware further includes:
  processing the received outbound request to determine a source of the received outbound request within the protected computer network.

21. The method of claim 20, further including:
  determining that the received outbound request does not include at least one valid tag;
  comparing an address associated with the received outbound request to a whitelist; and
  forwarding the received outbound request if the associated address is included in the whitelist.

22. A non-transitory computer memory storing instructions that when executed by a processor cause the processor to:
  receive content directed toward a protected computer network;
  determine if the content comprises original content, or if the content comprises a response to a request previously forwarded from the protected computer network to a second network; and
  if the content comprises original content, processing the content using an anti-malware engine executing on the processor to determine if the content is to be classified as malware, and if the content is not to be classified as malware, scanning the content for links comprising a uniform resource identifier, and if at least one link is found, adding a valid tag to the at least one link found in the content by altering the at least one link inside the content before forwarding the content to the protected computer network, wherein the valid tag adds information to the at least one link to indicate that the at least one link has been previously processed as part of original content processing for inbound original content.

23. The non-transitory computer memory of claim 22, wherein adding a valid tag to at least one link found in the content includes:
  determining that the content includes a plurality of links, and
  using heuristics to determine a reduced number of links of the plurality of links to which valid tags are to be applied, wherein each of the reduced number of links has a single valid tag added.

24. The non-transitory computer memory of claim 22, further including instructions to cause the processor to:
  determine that the content is to be classified as malware; and
  block the content from being forwarded to the protected computer network.

25. The non-transitory computer memory of claim 24, further including instructions to cause the processor to:
  report the classification of the content as malware to a user interface.

26. The non-transitory computer memory of claim 24, further including instructions to cause the processor to:
  determine that the content that is to be classified as malware is a reply to a particular request originating from the protected computer network;
  identify a source of the request located within the protected computer network; and
  isolate the source of the request from the protected computer network.

* * * * *